United States Patent [19]

Nishimura et al.

[11] Patent Number: 4,633,187
[45] Date of Patent: Dec. 30, 1986

[54] AM SYNCHRONOUS DETECTING CIRCUIT

[75] Inventors: Yoshikazu Nishimura; Yoshimi Yasukouchi; Hisao Asakura, all of Kanagawa, Japan

[73] Assignee: Sony Corporation, Tokyo, Japan

[21] Appl. No.: 727,561

[22] Filed: Apr. 26, 1985

[30] Foreign Application Priority Data

Apr. 27, 1984 [JP] Japan .................................. 59-85733

[51] Int. Cl.$^4$ .............................................. H03D 3/06
[52] U.S. Cl. ..................................... 329/50; 329/124; 358/25; 455/337
[58] Field of Search ......................... 329/50, 122, 124; 358/23, 25, 39; 455/337

[56] References Cited

U.S. PATENT DOCUMENTS 4,100,499 7/1978 Monrolin .............................. 329/50

Primary Examiner—Eugene R. LaRoche
Assistant Examiner—James C. Lee
Attorney, Agent, or Firm—Lewis H. Eslinger; Alvin Sinderbrand

[57] ABSTRACT

A demodulating circuit for an amplitude-modulated signal comprises an input terminal to be supplied with an input signal comprising at least a modulated carrier signal amplitude-modulated by an information signal, the modulated carrier signal having a predetermined phase; an oscillator for generating a first demodulating carrier the phase of which is displaced from that of the modulated carrier signal by 90°, and a second demodulating carrier which has the same phase as that of the modulated carrier signal; a first synchronous demodulator for demodulating the input signal with the first demodulating carrier; a second synchronous demodulator for demodulating the input signal with the second demodulating carrier; a level detector for detecting the level of a predetermined portion of the demodulated output of the first synchronous detector; a control circuit supplied with the output of the level detector for controlling the oscillator so that the phase of the second demodulating carrier is synchronous with that of the modulated carrier signal; and an output terminal connected to the second synchronous detector for receiving the demodulated information signal from the second synchronous detector. The demodulator circuitry according to the invention performs stable demodulation without using a limiter, and with the phase of the carrier signal for demodulation under its control, thus being free from dependence of the phase of carrier signals for demodulation on the level of input signals.

11 Claims, 5 Drawing Figures

AM SYNCHRONOUS DETECTING CIRCUIT

BACKGROUND OF THE INVENTION

1. Field of the Invention

This invention relates to a demodulator of amplitude-modulated signals transmitted from the output of a color video camera to apparatus such as a camera control unit (referred to as CCU hereinafter).

2. Description of the Prior Art

The transmission of video signals from the output of a video camera to a CCU is made along a cable while returning the video signal from the CCU over the same cable. Then, of the video signal from the video camera output, the luminance signal is amplitude-modulated onto a fixed frequency carrier wave, and two color difference signals are quadrature two-phase modulated before being transmitted. In the CCU, amplitude-demodulation is performed to construct the original luminance signal and two color difference signals.

Prior art demodulator circuitry for the amplitude-modulated signals accomplished the process consisting of passing the input signal through a band pass filter and a limiter to extract the carrier signal and supplying it to PLL circuitry, from which a carrier signal for use in demodulation is generated. It however has defects: the phase of output of the limiter depends on the input level, the phase of the carrier signal for synchronous demodulation is of low accuracy, and, because of the limited loop gain of PLL circuitry, there is a risk of unstability until the locked state is attained.

SUMMARY OF THE INVENTION

It therefore is an object of the invention to provide demodulator circuitry for amplitude-modulated signals permitting generating at higher accuracy carrier signals for demodulation of which phase is independent of input level.

The present invention is of a demodulator circuitry of signals subjected to quadrature two-phase modulation characterized in that it comprises first and second synchronous demodulators supplied with the input signal subjected to quadrature two-phase modulation with a first signal such as B-Y signal including a first identification signal such as burst signal, and a second signal such as an R-Y signal including a second identification signal such as synchronous signal; a carrier generating circuit for generating a carrier signal for demodulation applied to the first synchronous demodulation circuit, a carrier for detecting the synchronous signal from the demodulated output of the first synchronous demodulator and controlling the carrier generating circuit in accordance with the detected output so that, during the period of demodulation by the first synchronous demodulation circuit and outputting therefrom, the synchronous signal is zero; a 90° phase shifter for shifting the phase of the carrier signal by 90° and supplying the 90° phase-shifted carrier signal to the second synchronous demodulation circuit; and another circuit for detecting the burst signal from the demodulated output of the second synchronous circuit and controlling phase shift by the 90° phase shifter in accordance with the detected signal so that during demodulation output of the second synchronous demodulation circuit, the burst signal is zero.

The demodulator circuitry according to the invention performs stable demodulation without using a limiter, and with the phase of carrier signal for demodulation under its control, thus being free from dependence of the phase of carrier signals for demodulation on the level of input signals.

DESCRIPTION OF THE PREFERRED EMBODIMENT

The invention will be more fully described by way of an example with reference to the accompanying drawings:

The example is of application of the invention to transmission of a color video signal from a video camera to a CCU along a camera cable.

Figure 1:
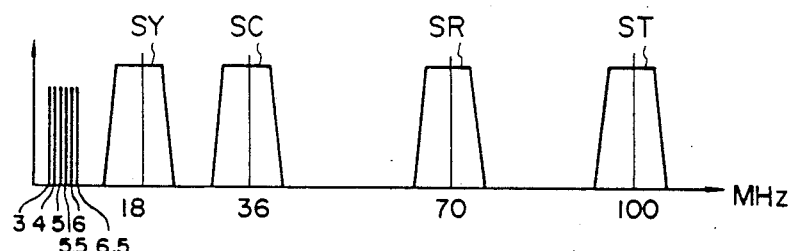
FIG. 1 shows wave spectra of a signal transmitted by an embodiment according to the invention.

FIG. 1 gives frequency spectra of signals transmitted between a CCU and a video camera. From the CCU to the video camera, a return video signal (composite video signal), a video signal for teleprompter, an intercom signal and program audio signal are transmitted. As shown in FIG. 1, SR is a frequency-modulated return video signal of 70 MHz carrier frequency, and ST is a frequency-modulated video signal for a teleprompter of 100 MHz carrier frequency. A frequency-demodulated intercom signal of 3 MHz carrier frequency and a frequency-modulated program audio signal of 4 MHz carrier frequency are also generated. The program audio signal refers to that which is being broadcasted.

On the other hand, from the video camera to CCU the following signals are transmitted: SY, which is an amplitude-modulated signal of 18 MHz carrier frequency; SC, consisting of an R-Y signal and a B-Y signal which have been quadrature two-phase modulated and having a carrier frequency of 36 MHz; frequency-modulated microphone signals for two channels having 5 MHz and 5.5 MHz carrier frequency, respectively; a frequency-modulated intercom signal of 6 MHz carrier frequency, and a discrimination signal having a carrier frequency of 6.5 MHz.

Figure 2:
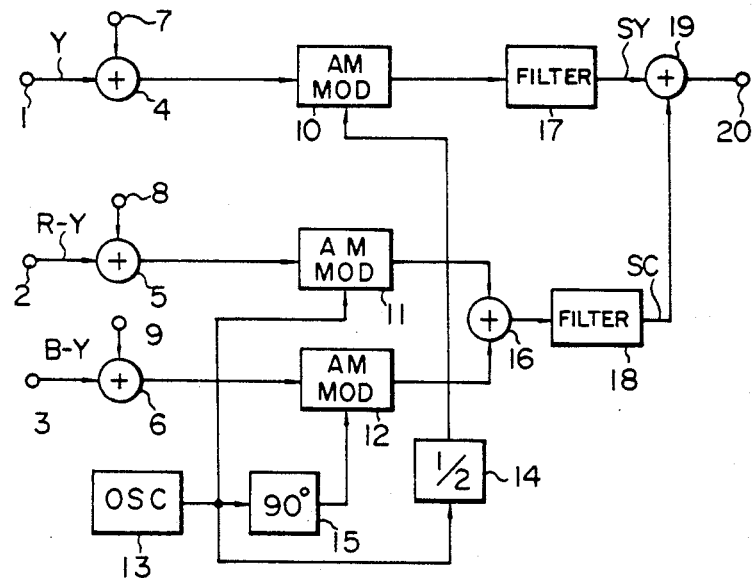
FIG. 2 is a block diagram of an embodiment of modulator circuitry according to the invention.

FIG. 2 is a block diagram of circuitry provided in the video camera unit and adapted for generating the above-mentioned SY and SC signals.

In FIG. 2, 1 is an input terminal receiving luminance signals from a video camera; 2 is an input terminal receiving R-Y signals from the video camera; and 3 is an input terminal receiving B-Y signals, respectively. The input luminance R-Y and B-Y signals are supplied to adders 4, 5 and 6, respectively. The receiving adder 4 is supplied with another signal or synchronous signal of horizontal period from terminal 7. The adder 5 is supplied with another signal or the second discrimination signal such as a synchronous signal of horizontal period from terminal 8. To the adder 6, another signal or the first discrimination signal such as burst signal is supplied from terminal 9.

Figure 3:
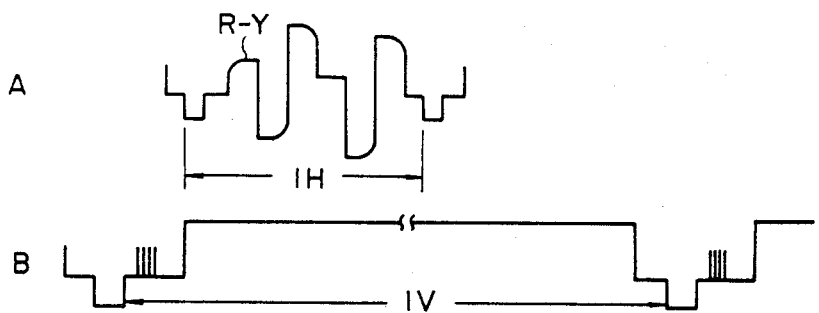
FIGS. 3A and 3B show waveform diagrams explaining signal transmission by an alternative embodiment according to the invention.

The output signal of the adder 4 is supplied to an amplitude modulator 10, to which the carrier signal of 18 MHz from a 2-fold divider circuit 14, receiving a 36 MHz carrier signal generated by an oscillator 13 for generating carrier signals and 2-fold dividing the frequency, is fed. The output signal of the adder 5 is supplied to another amplitude modulator 11, which also receives the carrier signal directly from the oscillator 13. The output signal of the adder 6 is supplied to another amplitude modulator 12 which additionally receives the 90°-shifted signal from a 90° shifter 15 receiving the output signal from the oscillator 13. The output signals of the amplitude modulators 11, 12 are fed to another adder 16. The output signal of the amplitude modulator 10 is supplied to another adder 19 through a filter 17, and the output signal of the adder 16 through to the adder 19 through a filter 18. The filters 17, 18 are provided for the elimination of unnecessary signals. The filter 17 generates amplitude-modulated luminance signals SY at the output having a center frequency of 18 MHz. At output of the filter 18 having a center frequency of 36 MHz, the quadrature two-phase modulated color difference signal SC is generated. Output signals of the adder 19 are transmitted to the CCU along a camera cable through an output terminal 20. The synchronous signal to be mixed with the luminance signal and R-Y signal may be a signal of horizontal period or an integral multiple of it, without always being limited to composite synchronization signals. FIG. 3A shows the waveform of a signal consisting of an R-Y signal plus a synchronous signal superposed onto it. Additionally, a burst signal superposed on the B-Y signal is for example a sine wave of 4.5 MHz, which may be obtained by frequency-division of the output of an oscillator 13. As shown in FIG. 3B, the burst signal is inserted during one horizontal period followed every vertical period.

Figure 4:
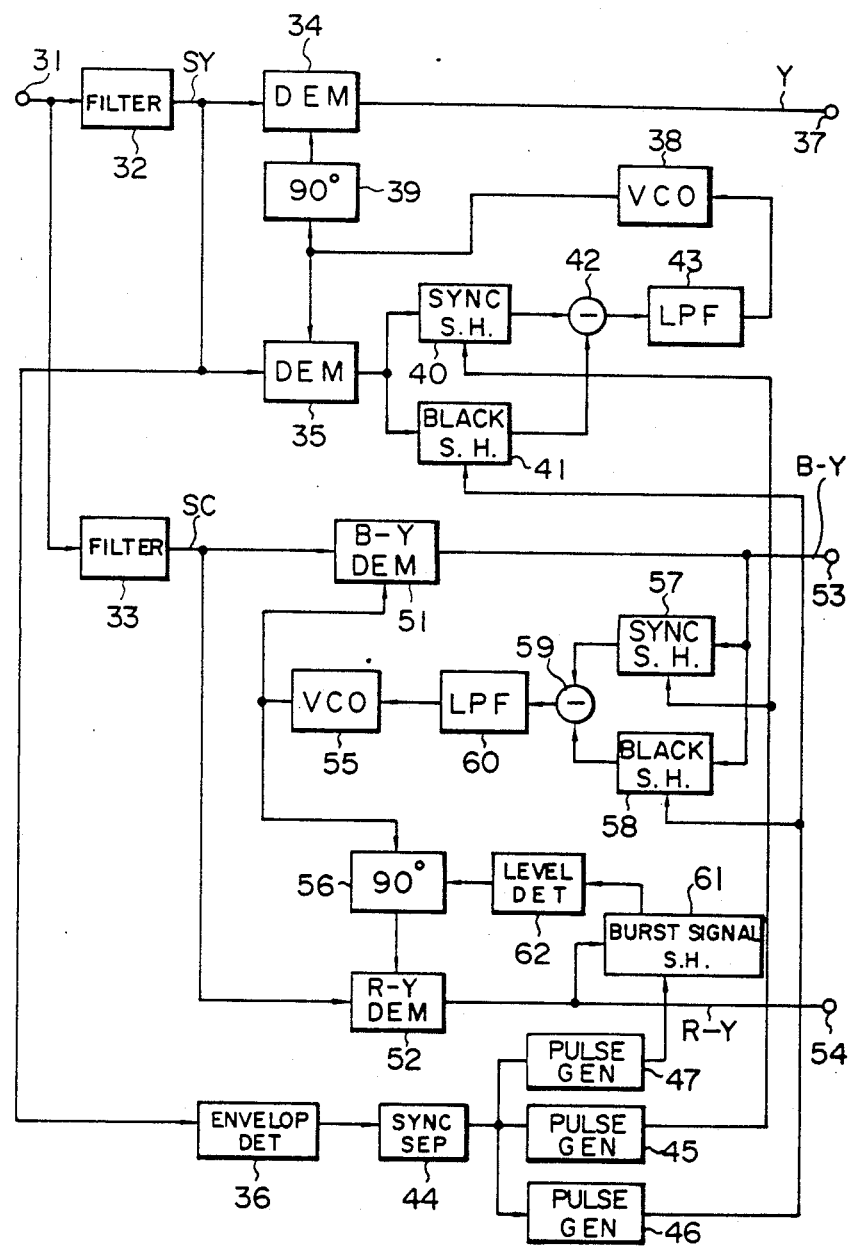
FIG. 4 is a block diagram of demodulator circuitry according to the invention.

FIG. 4 is a block diagram of circuitry for demodulating signals output from a video camera and transmitted to a CCU along a camera cable. In FIG. 4, a reference character 31 designates an input terminal connected to filters 32 and 33. The filter 32 separates the amplitude-modulated luminance signal SY, and the filter 33 separates the quadrature two-phase modulated color-difference signal SC.

The amplitude-demodulated luminance signal SY is fed to first and second synchronous demodulators 35, 34 and an envelope detector 36. Luminance signal Y is generated at the output of the synchronous demodulator 34 and available at an output terminal 37. To the synchronous demodulator 35, the output signal of a VCO (Voltage controlled oscillator) 38 is fed as a carrier signal. A carrier signal is fed from the VCO 38 to the synchronous demodulator 34 through a 90° phase shifter 39. A reference character 40 indicates a synchronous signal sample hold circuit and 41 a black level sample-hold circuit. The two sample-hold circuits 40, 41 receive output signals of the synchronous demodulator 35, and feed their output signals to a subtraction circuit 42. Output signals of the subtraction circuit 42 are fed as a feedback signal to the VCO 38 through a low pass filter 43.

Color difference signals SC subjected to quadrature two-phase modulation are output from a filter 33 and fed to synchronous demodulators 51 and 52. Output signal of the synchronous demodulator 51 are available as B-Y signals at an output terminal 53. Output signals of the synchronous demodulator 52 are available as R-Y signals at an output terminal 54. Output signals of the synchronous demodulator 51 are fed to another synchronous signal sample-hold circuit 57 and a black level sample-hold circuit 58. Output signals of the synchronous demodulator 51 are fed to the two sample-hold circuits 57, 58, of which output signals are fed to another subtractor for error detection 59. Output signals of the subtractor 59 are supplied as control signals to the VCO 55 through another low pass filter 60.

Output signals of the VCO 55 are fed as carrier signals to the synchronous demodulator 51, and to the synchronous demodulator 52 through a 90° phase shifter 56. Output signals of the synchronous demodulator 52 are fed to a level detector 62 through another burst signal sample-hold circuit 61. The output signal of the level detector 62 is supplied as a control voltage to the 90° phase shifter 56, which is affected by this control voltage to control the phase shift. Sampling pulses are fed from a pulse generator 45 to the sample-hold circuits 40, 57, from another pulse generator 46 to the sample hold circuits 41, 58, and from the pulse generator 47 to the sample-hold circuit 61. On the basis of the synchronous signal separated from output signals of the envelope detector 36 by a synchronous separation circuit 44, sampling pulses for sampling and holding the synchronous signal are formed in the pulse generator 45, sampling pulses for sampling and holding the black level in a pulse generator 46, and sampling pulses for sampling and holding the burst signal in the pulse generator 47.

The luminance signal demodulating system incorporates the subtracter 42, the low pass filter 43, the VCO 38, and the two sample-hold circuits 40, 41, which constitute PLL circuitry. The VCO 38 is controlled with respect to its oscillation phase so that the level of the output signal of the subtraction circuit 42 is zero. Under this condition, the phase of the carrier signal generated by the VCO 38 is different by 90 degrees from the normal demodulating axis of the amplitude-modulated signal. The output signal of the VCO 38 is supplied to the synchronous demodulator 34 through the 90° phase shifter 39, which then generates the luminance signal Y at the output.

Detection of the level of the synchronous signal is made with reference to the black level in order to avoid the influence of the level of the video signal (ALP). If there is provided a clamp circuit for bringing the black level to a fixed level, however, the design may be such that only the level of the synchronous signal can be detected.

The B-Y signal demodulation system incorporates a subtractor 59, a low pass filter 60, a VCO 55, and two sample-hold circuits 57, 58, which constitute PLL circuitry. The VCO 55 is controlled so that the level of the output signal of the subtractor 59 is zero; i.e. the level of the synchronous signal is zero. Under this condition, the phase of the carrier signal output from the VCO 55 coincides with the normal demodulating axis of amplitude-modulated B-Y signal. That is to say, the synchronous signal is incorporated only in the R-Y signal, and so no synchronous signal component develops in the output signal of the synchronous demodulator 51. This implies that the phase of the carrier signal from the VCO 55 coincides with the demodulating axis of the B-Y signal.

The output signal of the VCO 55 is fed through the 90° phase shifter 56 to the synchronous demodulator 52, where demodulation is carried out to obtain the original R-Y signal. The closed loop consisting of the synchronous demodulator 52, the burst signal sample-hold circuit 61, a level detector 62 and the 90° shifter 56 operates so as to bring the level of the burst signal to zero, contributing to preventing leaking of B-Y signal component into the R-Y signal.

As described above, the output terminals 37, 53 and 54 give the components of color video signal from the video camera: the luminance signal, the B-Y signal the and R-Y signal, respectively. Each signal is fed to a matrix circuit through a removing circuit, and a burst signal eliminating circuit (these circuits are not shown), to be converted into primary colors: red, green and yellow.

The invention can be applied to transmission not only of signals between a CCU and a video camera but also of color video signals for CATV and other applications.

What is claimed is:

1. A demodulating circuit for an amplitude-modulated video signal, comprising,
    an input terminal to be supplied with an input video signal comprising at least a modulated carrier signal amplitude-modulated by an information signal, said modulated carrier signal having a predetermined phase;
    oscillator means for generating a first demodulating carrier the phase of which is displaced from that of said modulated carrier signal by 90°, and a second demodulating carrier which has the same phase as that of said modulated carrier signal;
    a first synchronous demodulator for demodulating said input signal with said first demodulating carrier;
    a second synchronous demodulator for demodulating said input signal with said second demodulating carrier;
    a level detector for detecting the level of a predetermined portion of the demodulated output of said first synchronous demodulator;
    a control circuit supplied with the output of said level detector and producing a feedback signal for controlling said oscillator means so that the phase of said second demodulating carrier is synchronous with that of said modulated carrier signal; and
    an output terminal connected to said second synchronous demodulator for receiving the demodulated information signal from said second synchronous demodulator.

2. A demodulating circuit according to claim 1, wherein said information signal comprises a luminance signal and said input signal has only said modulated carrier signal which is amplitude-modulated by said luminance signal.

3. A demodulating circuit according to claim 2, wherein said luminance signal has an identification signal obtained from the demodulated output of said first synchronous demodulator.

4. A demodulating circuit according to claim 3, wherein said oscillator means comprises;
    an oscillator for generating one of said first and second demodulating carriers and
    a phase shifter for shifting the phase of the output of said oscillator by 90 degrees and for generating another of said first and second demodulating carriers.

5. A demodulating circuit according to claim 4, whrerein said control circuit controls said oscillator.

6. A demodulating circuit according to claim 1, wherein said information signal comprises a first chrominance signal and said input signal further comprises another modulated carrier signal with a phase which is displaced from that of said modulated carrier signal by 90 degrees, said another modulated carrier signal being amplitude-modulated by a second chrominance signal.

7. A demodulating circuit according to claim 6, wherein said first chrominance signal has a first identification signal and further comprising means for demodulating said first chrominance signal and a second level which detector detects the level of said first identification signal from the demodulated output of said means for demodulating said first chrominance signal.

8. A demodulating circuit according to claim 7, said demodulating circuit further comprising:
    second oscillator means,
    means for demodulating said second chrominance signal,
    a third level detector for detecting the level of a predetermined portion of the demodulated output of said means for demodulating said second chrominance signal, and
    a second control circuit supplied with the output of said third level detector for controlling said second oscillator means.

9. A demodulating circuit according to claim 8, wherein said second chrominance signal has a second identification signal, further comprising means for detecting the level of said second identification signal from the output of said means for demodulating said second chrominance signal.

10. A demodulating circuit according to claim 9, wherein said second oscillator means comprises
    a second oscillator for generating one of third and fourth demodulating carriers and
    a second phase shifter for shifting the phase of the output of said second oscillator by 90 degrees and for generating another of said third and fourth demodulating carriers.

11. A demodulating circuit according to claim 10, wherein said control circuit controls said oscillator while said second control circuit controls said phase of the shifted output of the second oscillator to a adjust the phase of said third and fourth demodulating carriers.

* * * * *